US011642862B2

(12) United States Patent
Jörn

(10) Patent No.: US 11,642,862 B2
(45) Date of Patent: May 9, 2023

(54) MOLDING DEVICE AND METHOD FOR PRODUCING A SHELL ELEMENT REINFORCED WITH SUPPORTING ELEMENTS AND COMPOSED OF FIBER COMPOSITE MATERIAL

(71) Applicant: AIRBUS OPERATIONS GMBH, Hamburg (DE)

(72) Inventor: Paul Jörn, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 296 days.

(21) Appl. No.: 17/178,400

(22) Filed: Feb. 18, 2021

(65) Prior Publication Data

US 2021/0260839 A1    Aug. 26, 2021

(30) Foreign Application Priority Data

Feb. 20, 2020   (DE) .................. 10 2020 104 519.0

(51) Int. Cl.
 *B29C 70/54*   (2006.01)
 *B29C 70/46*   (2006.01)
 *B29L 31/30*   (2006.01)

(52) U.S. Cl.
 CPC ............. *B29C 70/54* (2013.01); *B29C 70/46* (2013.01); *B29L 2031/3082* (2013.01)

(58) Field of Classification Search
 CPC ......... B29C 33/44; B29C 70/46; B29C 70/48; B29C 70/54; B29L 2031/3082; B29D 99/0014
 See application file for complete search history.

(56) References Cited

U.S. PATENT DOCUMENTS

2019/0184452 A1*   6/2019   Izumi .................. B22C 13/12

FOREIGN PATENT DOCUMENTS

DE   102009057009 A1   6/2011
EP         0409354 A2   1/1991
WO   WO 2014/175795 A1  10/2014

OTHER PUBLICATIONS

German Search Report for Application No. 10 2020 104 519.0 dated Oct. 30, 2020.

* cited by examiner

*Primary Examiner* — Philip C Tucker
*Assistant Examiner* — Evan T Hulting
(74) *Attorney, Agent, or Firm* — KDW Firm PLLC

(57) ABSTRACT

A molding device for producing a shell element reinforced with supporting elements and composed of fiber composite material, including a mold part with a mold surface including a cavity for receiving a supporting element of the shell element, and a mold core to be arranged in the cavity and to support the supporting element on the shell element when the supporting element of the shell element is arranged in the cavity. The molding device enables prevention of the mold cores from falling out in an uncontrolled manner when the shell element is removed from the mold as the mold core includes a holding device to engage with the supporting element of the shell element to be produced located in the cavity and to hold the mold core on the supporting element when the shell element to be produced is released from the mold part.

15 Claims, 4 Drawing Sheets

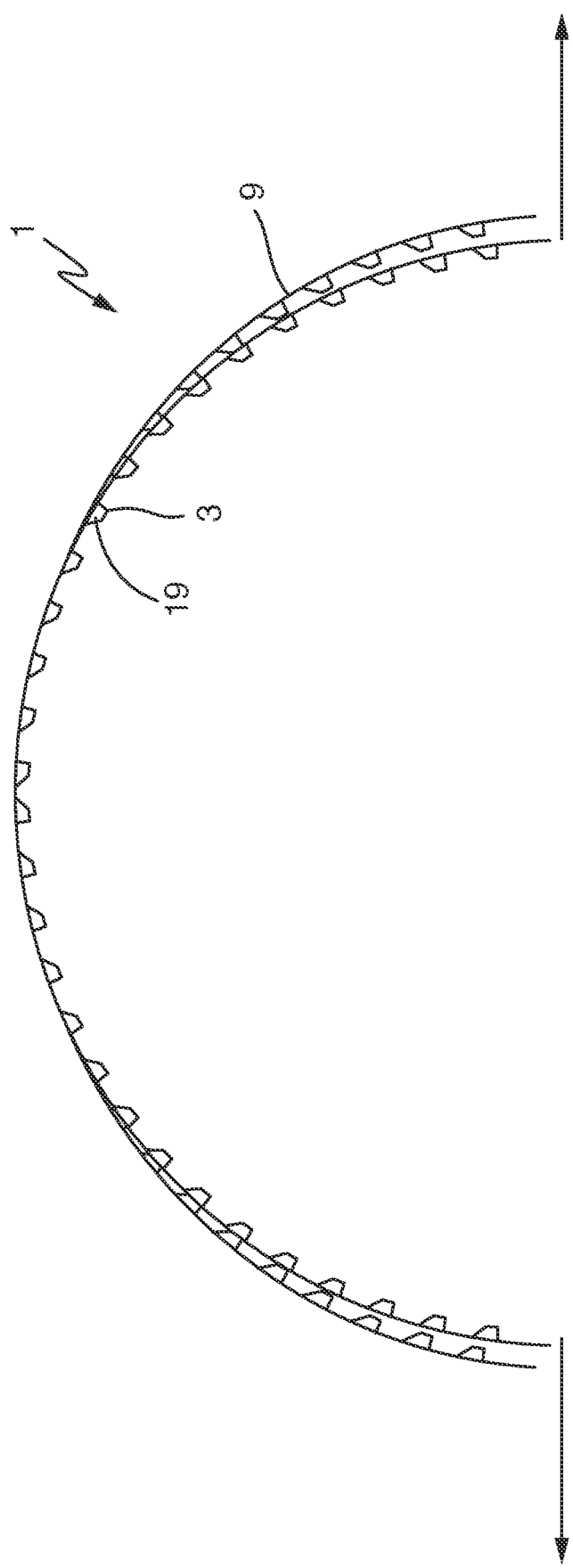

MOLDING DEVICE AND METHOD FOR PRODUCING A SHELL ELEMENT REINFORCED WITH SUPPORTING ELEMENTS AND COMPOSED OF FIBER COMPOSITE MATERIAL

CROSS-REFERENCE TO RELATED APPLICATION

This application claims priority to German Patent Application DE 10 2020 104 519.0 filed Feb. 20, 2020, the entire disclosure of which is incorporated by reference herein.

TECHNICAL FIELD

The disclosure herein relates to a molding device for producing a shell element reinforced with supporting elements, in particular a fuselage shell element of an aircraft, from fiber composite material. A further aspect of the invention relates to a method for producing such a shell element using such a molding device.

The molding device comprises a mold part and a mold core. The mold part, also referred to as mold, has a mold surface, which is intended to face towards and/or be in contact with the shell element to be produced and which comprises at least one preferably elongate cavity for receiving a supporting element of the shell element to be produced. The mold core can comprise one or more core parts and is designed or configured to be arranged in the cavity and to support the supporting element on the shell element during the production process, in particular during the hardening operation, when the supporting element of the shell element to be produced is arranged in the cavity.

BACKGROUND

Similar molding devices are known from the prior art. They are used, for example, in the production of fuselage shell elements which are reinforced on the inner side with stringers. In this respect, a preform of the shell element to be produced is provided with a skin element and a plurality of supporting elements arranged on the inner side of the skin element, and mold cores are arranged on the preform such that the supporting elements are supported with respect to the skin element. The preform together with the mold cores is subsequently arranged on the mold surface of the mold part, with the result that the supporting elements with the mold cores protrude into the cavities. After this, the shell element is hardened under the influence of pressure and temperature. After the hardening operation, the shell element is released from the mold part, i.e. the shell element is removed from the mold. Since the mold part here is usually arranged underneath the shell element and supports the shell element from below, after releasing the shell element from the mold part there is the risk that the mold cores are released from the shell element and fall away therefrom in an uncontrolled manner, it being possible for both the mold cores and the mold part to be damaged. This problem exists occurs in particular when using thermoplastic matrix material.

SUMMARY

An object of the disclosure herein is to provide a molding device with which it is possible to avoid the situation in which the mold cores fall out in an uncontrolled manner when the shell element is being removed from the mold.

The object is achieved in that the mold core comprises a holding device, which is designed to engage with the supporting element of the shell element to be produced that is located in the cavity and as a result to hold the mold core on the supporting element when the shell element to be produced is released from the mold part and removed, i.e. is removed from the mold. The mold core preferably comprises a plurality of such holding devices, which are spaced apart from one another in the longitudinal direction of the mold core and/or in the longitudinal direction of the supporting element. In this way, it is possible to prevent the mold core from falling out of the shell element in an uncontrolled manner and consequently to prevent damage to the mold core or the mold part. The holding device can also serve as transportation fastening means or demolding aids for the mold core.

In a preferred embodiment, the molding device is in the form of a closed tool and comprises a counter mold part, for example a pressure plate, with a counter mold surface which is designed to face towards or be in contact with the shell element to be produced. The counter mold part is configured to be brought, together with the mold part, into an open position and into a closed position, in which closed position the mold part and the counter mold part together enclose a hollow space which comprises the cavity and is designed, during the production process, to receive the shell element to be produced. With such a two-part, closed molding device, the required pressure is generated by pressing the mold part and counter mold part against one another and the required temperature is reached by heating the mold part and counter mold part. As an alternative, however, the molding device can also be in the form of an open tool, wherein only the mold part, but not a counter mold part, is present and which is treated in an autoclave for the purpose of hardening the shell element to be produced, where the required pressure is generated by the gas pressure and the required temperature is generated by the gas temperature in the autoclave.

In a further preferred embodiment, the mold core has a plurality of core parts, which are preferably formed as separate from one another. In this way, a plurality of sides of the supporting element can be supported by the core parts.

It is particularly preferable here when the mold core comprises a first core part and a second core part, wherein the first core part is designed to support the supporting element from a first side and the second core part is designed to support the supporting element from a second side opposite the first side when the supporting element of the shell element to be produced is arranged in the cavity. In this way, the supporting element can be supported from both sides in a simple and effective way.

In this respect, the first core part and/or the second core part are/is formed as wedge-shaped in cross section with a first contact surface, which is designed to bear against the mold surface of the mold part, a second contact surface, which is designed to bear against the supporting element when the supporting element of the shell element to be produced is arranged in the cavity, and a third contact surface, which is designed to bear against the skin element or against a flange of the supporting element that bears against the skin element. In this way, the core parts can transfer pressure from the mold part in an effective manner to the supporting element.

In a preferred embodiment, the holding device comprises a pin which is designed to engage with a cutout in the supporting element when the supporting element of the shell element to be produced is arranged in the cavity. The pin can be formed from the same material as the mold core, preferably metal, or can be formed from another material, for example fiber-reinforced or unreinforced plastic. In this way, a simple and effective holding device can be formed.

It is particularly preferable here when the pin is designed in the form of a projection on the surface of the mold core that is thus formed integrally with the mold core or is connected fixedly thereto. In this way, a particularly simple holding device is formed.

As an alternative, it is particularly preferable when the pin is in the form of a bolt, preferably of a screw, which is configured to be arranged in an axially movable manner in a bore, preferably a threaded bore, in the mold core and is configured to be introduced into a cutout in the supporting element that is in the form of a bore when the supporting element of the shell element to be produced is arranged in the cavity. In this way, a particularly simple and effective holding device is formed.

It is further preferable when the pin is designed to extend completely through a cutout in the supporting element that is in the form of a bore, preferably a passage bore, when the supporting element of the shell element to be produced is arranged in the cavity. The passage bore can be, for example, a drain hole in the supporting element. Such an engagement of pin and bore makes it possible to form a particularly secure hold of the mold core.

It is particularly preferable here when the bore is provided in both core parts and the bolt is designed to extend through the bore in both core parts and also through the passage bore in the supporting element when the supporting element of the shell element to be produced is arranged in the cavity. In this way, both core parts can be held on the supporting element in a particularly simple and effective manner.

As an alternative, it is preferable when the pin is formed on the surface of the first core part, wherein a bore corresponding to the pin is formed in the second core part, and wherein pin and bore are designed in such a way that the pin can extend through the passage bore in the supporting element and into the bore in the second core part when the supporting element of the shell element to be produced is arranged in the cavity. In this way, a further particularly simple holding device for both core parts is formed.

As an alternative to the pin, the holding device can also comprise a flexible, elastically or plastically deformable and/or tearable element which is designed to engage with a cutout, preferably a passage bore, in the supporting element when the supporting element of the shell element to be produced is arranged in the cavity. The element can sufficiently hold the mold core during removal from the mold, but can at the same time be easily deformed or torn in order to release the mold core from the shell element, with the result that the releasing of the mold core is facilitated. Such an element can for example be in the form of a cable, thread, wire or film, which are guided for example through a bore or a slot in the mold core and through a passage bore or a slot in the supporting element for the purpose of holding the mold core on the supporting element.

In a preferred embodiment, the holding device is in the form of a groove, i.e. depression, in the mold core which is configured to engage with a projection, in particular a resin peg, provided on the supporting element when the supporting element of the shell element to be produced is arranged in the cavity. To release the mold core from the shell element, the projection can for example simply be torn off from the supporting element when the supporting element has a form which is thin enough. In this way, a further particularly simple holding device is formed.

A further aspect of the disclosure herein relates to a method for producing a shell element, in particular fuselage shell element of an aircraft, that is reinforced with supporting elements and composed of fiber composite material. In the method, the following steps are carried out:

First, a molding device is provided according to one of the embodiments described above.

Moreover, an unhardened preform of the shell element to be produced is provided. The preform can be formed from dry fibers or as a preimpregnated unhardened semifinished product, i.e. from preimpregnated unhardened fibers. If the preform is formed from dry fibers, a resin matrix is added later, for example by resin infusion or injection. The resin can consist of or comprise a thermoset or thermoplastic polymer. If the resin is a thermoplastic polymer, the preform preferably comprises preimpregnated fibers, since the high viscosity of the thermoplastic material makes a resin infusion or injection difficult. The preform comprises a preferably curved skin element and at least one elongate supporting element arranged on an inner side, i.e. concave side, of the skin element and extending away from the skin element. In this case, the supporting element preferably comprises at least one flange or strap which bears against the skin element and also a web preferably extending perpendicularly away from the skin element. By way of example, the supporting element can be in the form of a T-, C-, Z-, I- or double T-profiled carrier. When the shell element is designed as a fuselage shell element of an aircraft, the supporting element is preferably a stringer which preferably runs parallel to the axis of curvature of the skin element.

The mold core is subsequently arranged on the preform such that the supporting element, in particular the web of the supporting element extending away from the skin element, is supported with respect to the skin element by the mold core, i.e. the position of the supporting element relative to the skin element is fixed by the mold core. In this step, the holding device of the mold core is preferably also brought into engagement with the supporting element. This can, however, also take place in a later step, for example when the preform consists of or comprises dry fibers without a matrix and therefore it is not yet possible for the supporting element to engage with the holding device in the present step.

In a subsequent or else in a preceding step, the preform, preferably together with the mold core, is arranged on the mold surface of the mold part, preferably in contact therewith, with the result that the supporting element, possibly with the mold core, protrudes into the cavity.

After this, the shell element, i.e. the preform, is hardened to afford a finished shell element. This preferably takes place with pressure and thermal treatment, preferably either in a closed tool, wherein the molding device also comprises a counter mold part in addition to the mold part, or in an open tool, which comprises only the mold part and is positioned in an autoclave for hardening. Hardening in an oven under vacuum is also possible and preferred.

Finally, the hardened shell element is removed from the mold, i.e. released and removed from the mold part. In the process, the holding device engages with the supporting element and holds the mold core on the supporting element as a result, even after the mold part has been removed from the shell element. The mold core can then be removed in a controlled manner by releasing the holding device. The features and effects explained above in conjunction with the molding device can also be used and are preferred with respect to the method.

To release the mold core from the shell element, the holding device can be released, in the case of a screw for example by being screwed off or drilled out, in the case of a pin for example by being pulled out, torn off or drilled out, in the case of a groove engaging with a projection in the supporting element for example by tearing off or pulling out the projection, and in the case of a flexible element for example by deforming and possibly pulling out and/or tearing the element.

In a preferred embodiment, the preform is formed from fibers preimpregnated with resin, wherein the pin is preferably brought into engagement with the cutout when or after the mold core is arranged on the preform. This constitutes a particularly simple and advantageous method when using thermoplastic resin.

In an alternative preferred embodiment, the preform is formed from dry fibers, wherein, after the arranging of the preform together with the mold core on the mold surface of the mold part and before the hardening, the preform is provided, in particular saturated, with resin. This is preferably performed by resin infusion or injection, for example in what is known as a resin infusion (RI) process or resin transfer molding (RTM) process. This constitutes a particularly simple and advantageous method when using thermosetting resin.

BRIEF DESCRIPTION OF THE DRAWINGS

Example embodiments of the disclosure herein will be explained in more detail below on the basis of a drawing, in which:

FIG. 4 shows a schematic cross-sectional view of the shell element from FIG. 1, which is bent upwards to remove the mold cores.

DETAILED DESCRIPTION

Figure 1:
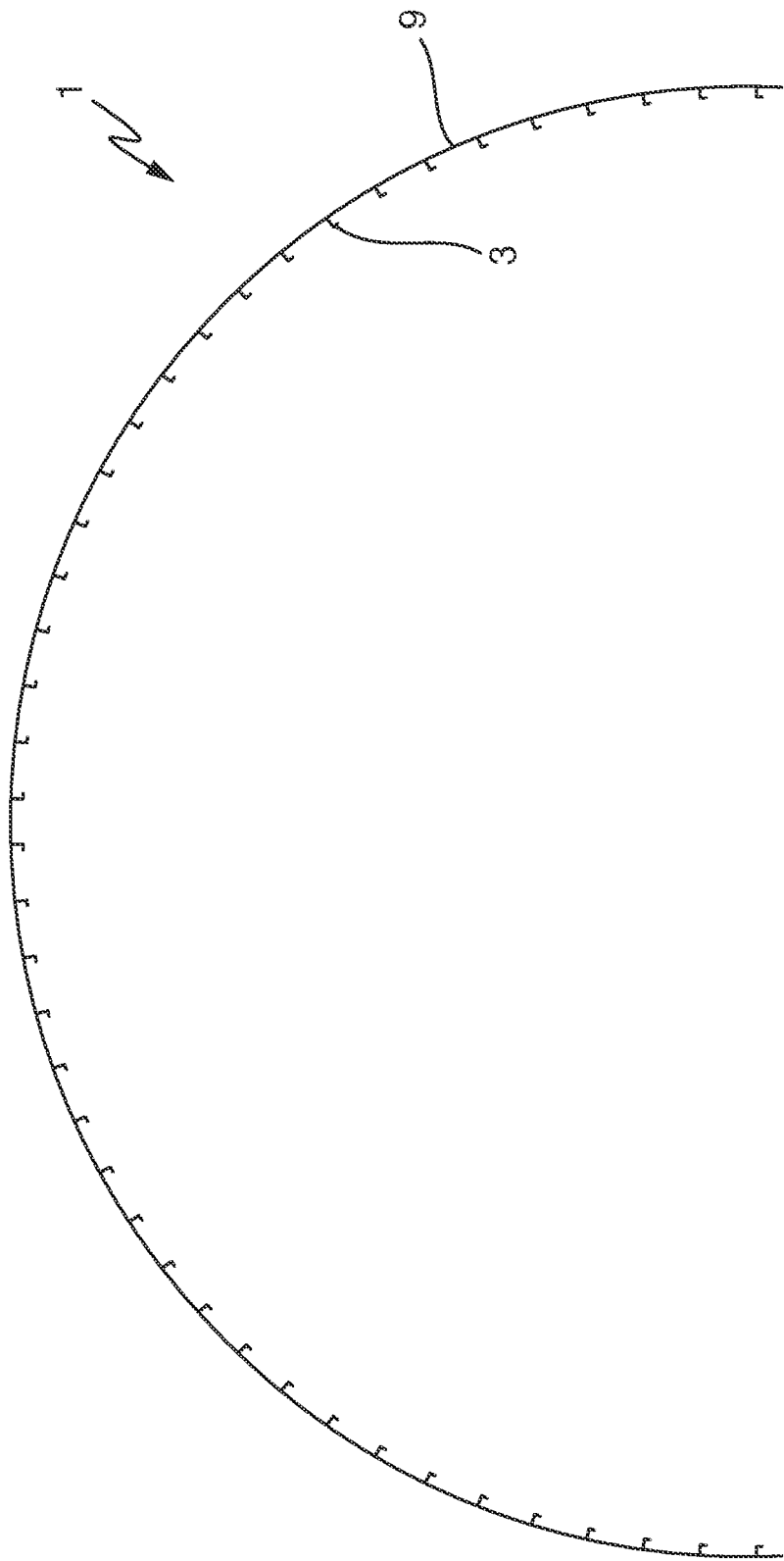
FIG. 1 shows a schematic cross-sectional view of a shell element in the form of a fuselage shell element of an aircraft fuselage, which can be produced by the disclosure herein.
Figure 2:
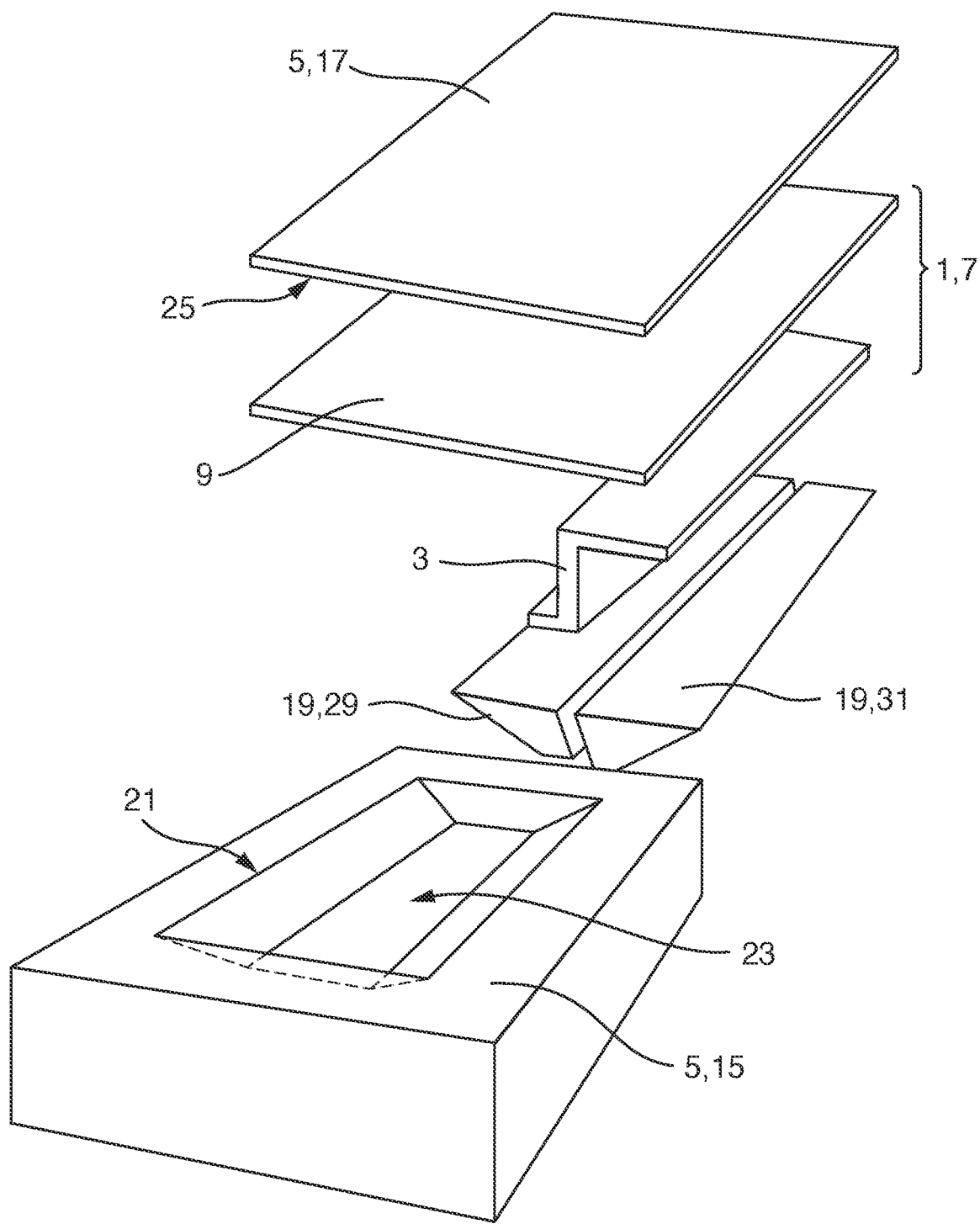
FIG. 2 shows a schematic exploded view of a molding device according to an example embodiment of the disclosure herein with a shell element to be produced.
Figure 3:
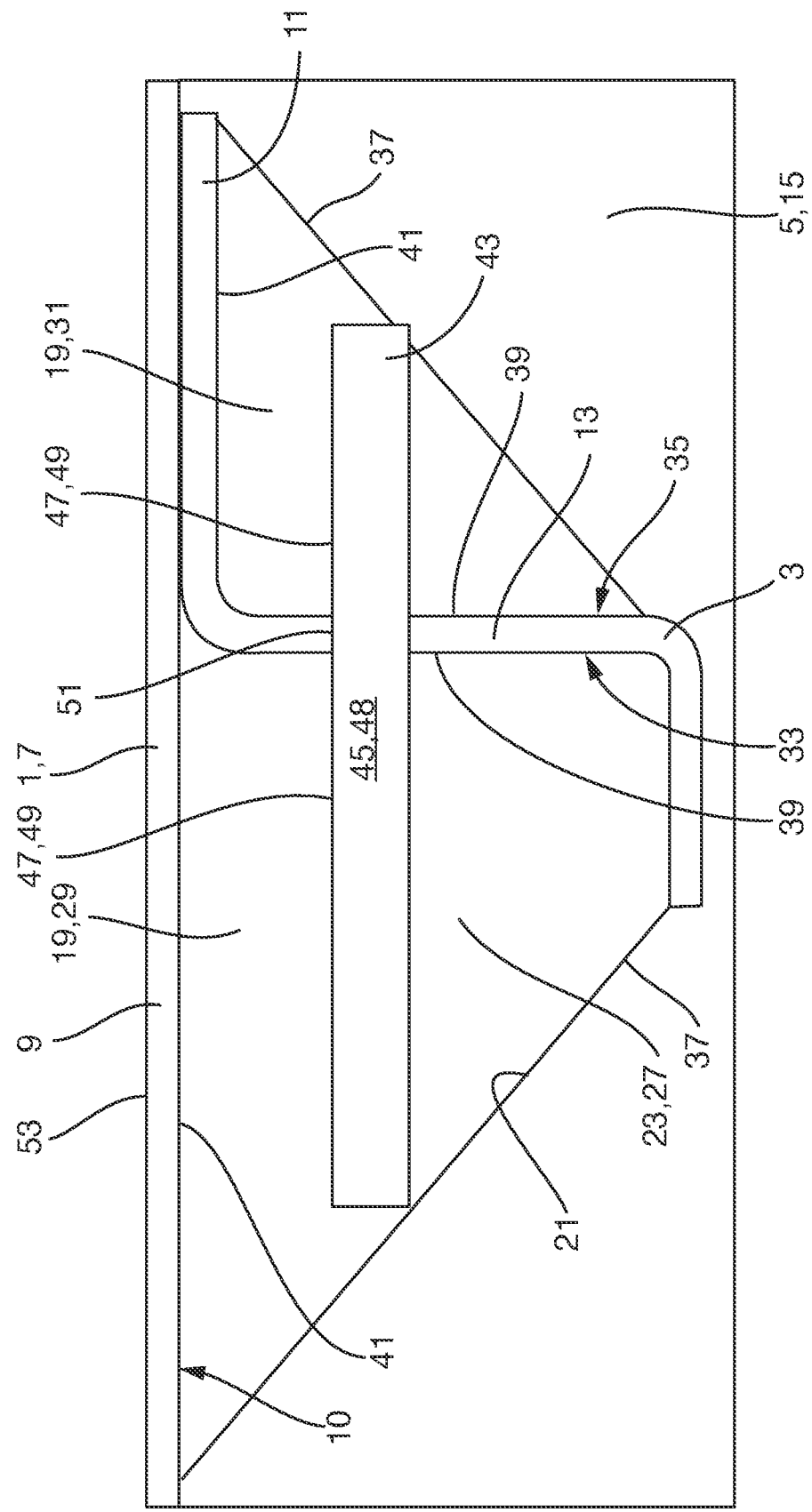
FIG. 3 shows a schematic cross-sectional view of the molding device from FIG. 2.

FIG. 1 shows a shell element 1 which is reinforced with supporting elements 3, composed of fiber composite material and in the form of a fuselage shell element of an aircraft. The shell element 1 can be produced by a molding device 5 according to the disclosure herein and a method according to the disclosure herein. The molding device 5 and the method are explained below on the basis of the example embodiment shown in FIGS. 2 and 3.

First, a molding device 5 and an unhardened preform 7, corresponding to the molding device 5, of the shell element 1 to be produced are provided.

The preform 7 is formed from fibers preimpregnated with unhardened thermoplastic polymer. The preform 7 comprises a skin element 9 and an elongate supporting element 3, a stringer in the present example embodiment, which is arranged on an inner side 10 of the skin element 9 and extends away from the skin element 9. In this case, the supporting element 3 has a flange 11 which bears against the skin element 9 and a web 13 extending perpendicularly away from the skin element 9. In the present example embodiment, the supporting element 3 is in the form of a Z-profiled carrier.

The molding device 5 is in the form of a closed tool and comprises a mold part 15, a counter mold part 17 and a mold core 19. The mold part 15, also referred to as mold, has a mold surface 21 which is intended to face towards the shell element 1 to be produced and which comprises at least one elongate cavity 23 for receiving the supporting element 3 of the shell element 1 to be produced.

The counter mold part 17, also referred to as pressure plate, has a counter mold surface 25 which is designed to face towards the shell element 1 to be produced and to exert pressure thereon. The counter mold part 17 is configured to be brought, together with the mold part 15, into an open position and into a closed position, wherein in the closed position the mold part 15 and the counter mold part 17 together enclose a hollow space 27 which comprises the cavity 23 and is designed, during the production process, to receive the shell element 1 to be produced.

The mold core 19 is designed to be arranged in the cavity 23 and to support the supporting element 3 on the shell element 1 during the production process, in particular during the hardening operation, when the supporting element 3 of the shell element 1 to be produced is arranged in the cavity 23.

In the present example embodiment, the mold core 19 comprises a first core part 29 and a second core part 31, wherein the first core part 29 is designed to support the supporting element 3 from a first side 33 and the second core part 31 is designed to support the supporting element 3 from a second side 35 opposite the first side 33 when the supporting element 3 of the shell element 1 to be produced is arranged in the cavity 23. In this respect, the first core part 29 and the second core part 31 are formed as wedge-shaped in cross section with a first contact surface 37, which is designed to bear against the mold surface 21 of the mold part 15, a second contact surface 39, which is designed to bear against the supporting element 3 when the supporting element 3 of the shell element 1 to be produced is arranged in the cavity 23, and a third contact surface 41, which is designed to bear against the skin element 9 and/or against the flange 11 of the supporting element 3 that bears against the skin element 9.

The mold core 19 further comprises a holding device 43, which is designed to engage with the supporting element 3 of the shell element 1 to be produced that is located in the cavity 23, and as a result to hold the mold core 19 on the supporting element 3 when the shell element 1 to be produced is released from the mold part 15, i.e. is removed from the mold. The holding device 43 comprises a pin 45 which is designed to engage with a cutout 47 in the supporting element 3 when the supporting element 3 of the shell element 1 to be produced is arranged in the cavity 23. In the present example embodiment, the pin 45 is in the form of a bolt 48, in particular a threaded bolt, which is configured to be arranged in an axially movable manner in a bore 49, in particular a threaded bore, in the mold core 19 and is configured to be introduced into the cutout 47 in the supporting element 3 that is in the form of a passage bore 51 when the supporting element 3 of the shell element 1 to be produced is arranged in the cavity 23. Here, the bore 49 is provided in both core parts 29, 31 and the bolt 48 is designed to extend through the bore 49 in both core parts 29, 31 and also through the passage bore 51 in the supporting element 3 when the supporting element 3 of the shell element 1 to be produced is arranged in the cavity 23.

The mold core 19, i.e. the two core parts 29, 31, is subsequently arranged on the preform 7 such that the supporting element 3, in particular the web 13 of the supporting element 3 extending away from the skin element 9, is supported with respect to the skin element 9 by the core parts 29, 31 from both sides 33, 35, i.e. the position of the supporting element 3 relative to the skin element 9 is fixed by the mold core 19. In this respect, the holding device 43 of the mold core 19 is also brought into engagement with the supporting element 3, i.e. the bolt 45 is introduced, in particular screwed in, through the bore 49 in the core parts 29, 31 and the passage bore 51 in the supporting element 3.

The preform 7 together with the mold core 19 is subsequently arranged on the mold surface 21 of the mold part 15, with the result that the supporting element 3 with the mold core 19 protrudes into the cavity 23. In the process, the first contact surface 37 bears against the mold surface 21 of the mold part 15, the second contact surface 39 bears against the supporting element 3 and the third contact surface 41 bears against the skin element 9 and/or against the flange 11 of the supporting element 3 that bears against the skin element 9. Then, the counter mold part 17 is brought into the closed position with the mold part 15 such that the counter mold surface 25 presses against that surface 53 of the skin element 9 which faces away from the supporting element 3.

The shell element 1 is then hardened under a predetermined influence of pressure and temperature for a predetermined duration.

Finally, the hardened shell element 1 is removed from the mold, i.e. released and removed from the mold part 15. In the process, the mold core 19 is held on the supporting element 3 by the engagement of the holding device 43 with the supporting element 3, even after the mold part 15 has been removed from the shell element 3. The mold core 19 can then be removed in a controlled manner by releasing the holding device 43.

FIG. 4 shows how the mold cores 19 can be removed in the case of a shell element 1 designed as a fuselage shell element of an aircraft. As a result of the curved form of the skin element 9, the shell element 1 is bent upwards a little, i.e. the radius of curvature is increased, for the purpose of removing the mold cores 19. In this way, the clamping fit of the mold cores 19 and/or of the individual core parts 29, 31 between the supporting element 3 and the skin element 9 is released and the mold cores and/or core parts can be removed. By virtue of the holding device 43, the mold cores 19 are prevented from falling out in an uncontrolled manner when the shell element 1 is bent upwards.

The disclosure herein thus makes it possible to prevent the mold core 19 or the mold cores from falling out of the shell element 1 in an uncontrolled manner and consequently to prevent damage to the mold core 19 or the mold part 15.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A molding device for producing a shell element reinforced with supporting elements and composed of fiber composite material, comprising:
   a mold part having a mold surface, which comprises at least one cavity for receiving a supporting element of the shell element to be produced;
   a mold core for being arranged in the cavity to support the supporting element on the shell element when the supporting element of the shell element to be produced is arranged in the cavity; and
   the mold core comprising a holding device to engage with the supporting element of the shell element to be produced that is located in the cavity, and as a result to hold the mold core on the supporting element when the shell element to be produced is released from the mold part.

2. The molding device according to claim 1, wherein the molding device is in a form of a closed tool and comprises a counter mold part with a counter mold surface, wherein the counter mold part is configured to be brought, together with the mold part, into a closed position, in which the mold part and the counter mold part together enclose a hollow space which comprises the cavity to receive the shell element to be produced.

3. The molding device according to claim 1, wherein the mold core has a plurality of core parts.

4. The molding device according to claim 3, wherein the mold core comprises a first core part and a second core part, wherein the first core part is configured to support the supporting element from a first side and the second core part is configured to support the supporting element from a second side opposite the first side.

5. The molding device according to claim 4, wherein the first core part and/or the second core part are formed as wedge-shaped with a first contact surface, which is configured to bear against the mold surface of the mold part, a second contact surface, which is configured to bear against the supporting element, and a third contact surface, which is configured to bear against a skin element or against a flange of the supporting element that bears against the skin element.

6. The molding device according to claim 1, wherein the holding device comprises a pin to engage with a cutout in the supporting element.

7. The molding device according to claim 6, wherein the pin is in a form of a projection on a surface of the mold core.

8. The molding device according to claim 6, wherein the pin is in a form of a bolt for being arranged in a bore in the mold core.

9. The molding device according to claim 6, wherein the pin is configured to extend completely through a cutout in the supporting element that is in a form of a passage bore.

10. The molding device according to claim 9, wherein the mold core has a plurality of core parts, the mold core comprises a first core part and a second core part, the first core part is configured to support the supporting element from a first side and the second core part is configured to support the supporting element from a second side opposite the first side, the pin is in a form of a bolt for being arranged in a bore in the mold core, and the bore is provided in both core parts and the bolt is configured to extend through the bore in the core parts and also through the passage bore in the supporting element.

11. The molding device according to claim 9, wherein the mold core has a plurality of core parts, the mold core comprises a first core part and a second core part, the first core part is configured to support the supporting element from a first side and the second core part is configured to support the supporting element from a second side opposite the first side, the pin is in a form of a projection on a surface of the mold core, the pin is formed on a surface of the first core part, a bore is formed in the second core part, and wherein the pin and bore are configured such that the pin can extend through the passage bore in the supporting element and into the bore in the second core part.

12. The molding device according to claim 1, wherein the holding device is in a form of a groove in the mold core which is configured to engage with a projection provided on the supporting element.

13. A method for producing a shell element reinforced with supporting elements and composed of fiber composite material, the method comprising:
   providing a molding device for producing a shell element reinforced with supporting elements and composed of fiber composite material, comprising:
      a mold part having a mold surface, which comprises at least one cavity for receiving a supporting element of the shell element to be produced;
      a mold core for being arranged in the cavity to support the supporting element on the shell element when the supporting element of the shell element to be produced is arranged in the cavity; and
      the mold core comprising a holding device to engage with the supporting element of the shell element to be produced that is located in the cavity, and as a result to hold the mold core on the supporting element when the shell element to be produced is released from the mold part;
   providing a preform of the shell element to be produced, comprising a skin element and at least one supporting element arranged on an inner side of the skin element;
   arranging the mold core on the preform such that the supporting element is supported with respect to the skin element;
   arranging the preform on the mold surface of the mold part such that the supporting element protrudes into the cavity;
   hardening the shell element; and
   releasing the shell element from the mold part, wherein the holding device engages with the supporting element and holds the mold core on the supporting element as a result.

14. The method according to claim 13, wherein the preform is formed from preimpregnated fibers.

15. The method according to claim 13, wherein the preform is formed from dry fibers, and wherein, after arranging of the preform on the mold surface of the mold part, the preform is provided with resin.

\* \* \* \* \*